US012717277B2

(12) United States Patent
Hoti et al.

(10) Patent No.: US 12,717,277 B2
(45) Date of Patent: Aug. 25, 2026

(54) CORRECTOR BUTTON AND METHOD FOR ASSEMBLING SUCH A CORRECTOR BUTTON ONTO A WATCH CASE

(71) Applicant: MECO SA, Grenchen (CH)

(72) Inventors: Valon Hoti, Bienne (CH); Rémy Thiry, Les Bréseux (FR); Samuel Geiser, Bienne (CH)

(73) Assignee: MECO SA, Grenchen (CH)

( * ) Notice: Subject to any disclaimer, the term of this patent is extended or adjusted under 35 U.S.C. 154(b) by 507 days.

(21) Appl. No.: 17/931,234

(22) Filed: Sep. 12, 2022

(65) Prior Publication Data

US 2023/0143106 A1 May 11, 2023

(30) Foreign Application Priority Data

Nov. 10, 2021 (EP) .................................... 21207599

(51) Int. Cl.
*G04B 3/04* (2006.01)

(52) U.S. Cl.
CPC .................................... *G04B 3/048* (2013.01)

(58) Field of Classification Search
CPC ........ G04B 3/048; G04B 37/106; G04D 1/00; G04G 17/00; G04G 17/08; G04G 21/00; G04G 21/08; H01H 13/14; H01H 13/04
See application file for complete search history.

(56) References Cited

U.S. PATENT DOCUMENTS 4,482,260 A * 11/1984 Fehrenbacher ........ G04C 21/04 968/452
7,387,434 B2 * 6/2008 Hiranuma ............ G04B 37/106 368/290
2007/0074545 A1 * 4/2007 Hiranuma ............ G04B 37/106 70/25
2019/0072905 A1 3/2019 Loetscher

FOREIGN PATENT DOCUMENTS

| | | |
|---|---|---|
| CH | 692 255 A5 | 4/2002 |
| DE | 20 2018 004 222 U1 | 10/2018 |
| EP | 0 532 817 B1 | 1/1996 |
| EP | 3 451 071 A1 | 3/2019 |

OTHER PUBLICATIONS

Partial machine translation of DE 202018004222 (Year: 2024).*
European Search Report Issued Mar. 31, 2022 in European Application 21207599.8 Filed on Nov. 10, 2021 (with English Translation of Categories of Cited Documents), 3 pages.

* cited by examiner

*Primary Examiner* — Edwin A. Leon
(74) *Attorney, Agent, or Firm* — Oblon, McClelland, Maier & Neustadt, L.L.P.

(57) ABSTRACT

A corrector button for a watch case including a socket of axis of revolution having a threading arranged on the outer rim of a portion intended to be fitted by screwing onto a watch case, and having a cavity extending between a first end of the socket and a second end of the socket; a movable control rod engaged in the cavity of the socket and movable in translation along the axis of revolution, the movable control rod (Continued)

including a push-rod, having a rotation organ, and a push-button rigidly connected to the push-rod. The cavity has a portion of polygonal cross-section, and wherein the push-rod of the movable control rod includes a portion having a complementary polygonal cross-section in respect of the portion of polygonal cross-section of the cavity, such that the rotation of the push-rod via the rotation organ drives the rotation of the socket.

13 Claims, 3 Drawing Sheets

A - A

CORRECTOR BUTTON AND METHOD FOR ASSEMBLING SUCH A CORRECTOR BUTTON ONTO A WATCH CASE

CROSS-REFERENCE TO RELATED APPLICATION

This application claims priority to European Patent Application No. 21207599.8 filed on Nov. 10, 2021, the entire disclosure of which is hereby incorporated herein by reference.

TECHNICAL FIELD OF THE INVENTION

The field of the invention relates to small-sized watch corrector-buttons, also known as correctors, embedded in the middle of a watch case, as well as the fitting of such a corrector button onto a watch case.

TECHNOLOGICAL BACKGROUND

Some watches, in particular watches comprising several complications, offer their user such a high number of functions that it is not possible to correct them all using a single rewinding and correction crown. For this reason, such watches comprise additional correction means such as corrector buttons.

Corrector buttons are typically miniature push-buttons which are embedded in the watch middle and which are usually actuated using a small, generally pointed, instrument.

These corrector buttons, also known as correctors, conventionally comprise an outer socket driven, glued or screwed into an opening formed in the watch middle, and a cylindrical control rod capable of sliding freely in the socket to activate a control of a horological movement.

The correction operations, via these corrector buttons, are conventionally performed by pressing the control rod into the socket against a return force of a return element, and by means of a pointed instrument.

These corrector buttons have reduced dimensions, which makes it possible to save space and fit them more readily on the middle, particularly with respect to push-button type controls. Furthermore, these corrector buttons do not protrude from the surface of the middle so that they have the advantage of not being capable of being actuated involuntarily.

Although these corrector buttons have reduced dimensions, the multiplication thereof on the middle can pose fitting problems. Consequently, there is a need to miniaturise these corrector buttons further in order to be able to implement them more readily.

Furthermore, these small corrector buttons can be difficult to assemble onto the middle of a watch case. Consequently, the multiplication thereof on watches comprising numerous complications makes the assembly of the watch more complex. Consequently, there is also a need for simplification and improvement of the method for fitting these corrector buttons.

SUMMARY OF THE INVENTION

In this context, the invention provides a novel corrector button architecture making it possible to simplify the method for fitting/dismantling such a corrector button and make maintenance operations easier.

The novel corrector button architecture according to the invention enables a modular fitting of a corrector button supplied complete, the functional characteristics of which have been tested beforehand by the corrector button production shop prior to fitting onto the watch case middle.

The novel corrector button architecture according to the invention makes it possible to simplify the method for fitting such a corrector button and enable quick fitting onto the middle with a single operation.

The corrector button according to the invention also makes it possible to embed the corrector button in a middle of lesser thickness with respect to the solutions known from the prior art.

To this end, the invention relates to a watch case corrector button comprising:

- a socket of axis of revolution having a threading arranged on the outer rim of a portion intended to be fitted by screwing onto a watch case, and having a cavity extending between a first end of the socket and a second end of the socket;
- a movable control rod engaged in the socket cavity and movable in translation along said axis of revolution, said movable control rod comprising a push-rod, having a rotation organ, and a push-button rigidly connected to said push-rod;

said corrector button being characterised in that said cavity has a portion of polygonal cross-section, and in that said push-rod of said movable control rod comprises a portion having a complementary polygonal cross-section in respect of said portion of polygonal cross-section of said cavity, such that the rotation of the push-rod via the rotation organ drives the rotation of said socket.

Besides the features mentioned in the paragraph above, the corrector button according to the invention can have one or more of the following additional features, considered individually or according to any technically possible combinations:

- the push-rod comprises a push-rod head forming a first end of said push-rod, said push-rod head comprising an impression forming said rotation organ of said push-rod;
- the impression is a slot capable of cooperating with a male part of a drive tool;
- the push-rod is driven with said push-button;
- the push-button comprises an annular groove configured to receive a sealing organ, said sealing organ ensuring the sealing between said push-button and said socket;
- the push-button comprises, at the top surface thereof, an impression configured to promote the positioning of one end of a tool;
- the impression of said push-button is of conical shape;
- the corrector button comprises a return organ for repositioning said movable control rod into a rest position, said return organ being disposed between a first fixed banking and a second movable banking arranged at said push-button;
- said fixed banking is formed by a bottom arranged at said socket cavity;
- the portion of the socket comprising said threading arranged on the outer rim is a median portion positioned between said first end of the socket and said second end of the socket;
- the threading arranged on the outer rim of the portion of the socket has a right-hand thread.

The invention also relates to a watch case comprising a bed, having a tapped portion, and a corrector button according to the invention, said corrector button being screwed into said bed of said middle.

Advantageously, said corrector button is embedded in said middle, such that it does not protrude from the middle.

The invention also relates to a method for assembling a corrector button according to the invention onto a watch case. The assembly method comprises a step of screwing said corrector button into a bed having a tapped portion and arranged at the middle of said watch case, the screwing step being performed by inserting a rotation tool inside the watch case, said rotation tool acting upon said push-rod by engaging said rotation tool into the rotation organ, the rotation of said push-rod driving the rotation of said socket and the screwing of said corrector button.

BRIEF DESCRIPTION OF THE FIGURES

The aims, advantages and features of the present invention will emerge on reading the following detailed description with reference to the following figures.

In all the figures, common elements bear the same reference numbers unless specified otherwise.

DETAILED DESCRIPTION OF THE INVENTION

Figure 1:
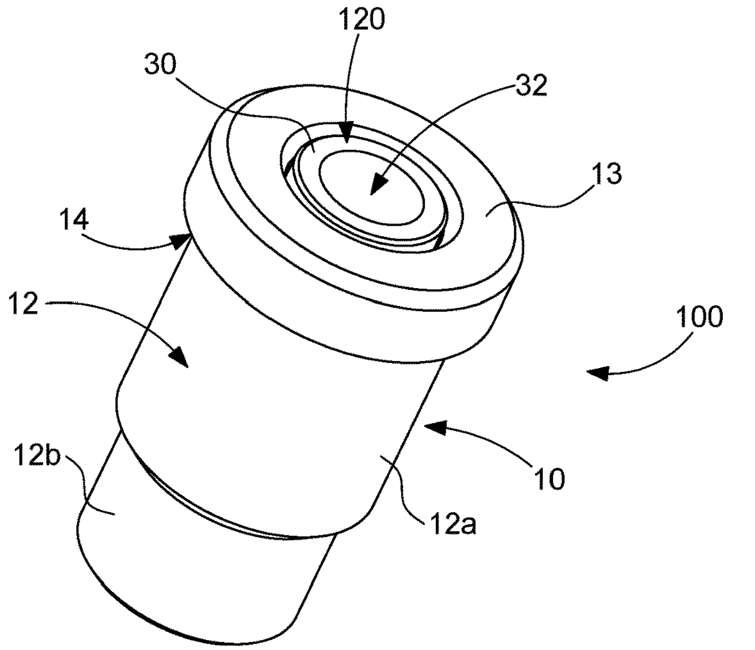
FIG. 1 represents a perspective view of an embodiment example of a corrector button according to the invention.

FIG. 1 illustrates, in a perspective view, an embodiment example of a corrector button 100 according to the invention.

Figure 2:
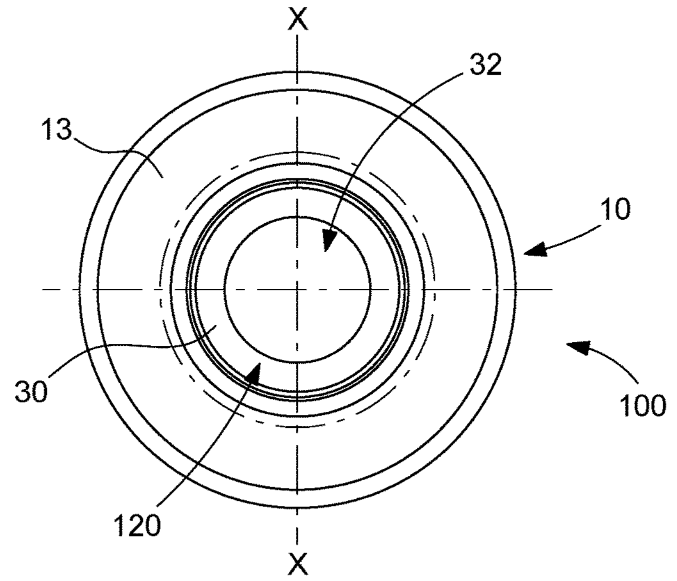
FIG. 2 represents a top view of the embodiment example of the corrector button illustrated in FIG. 1.

FIG. 2 illustrates a top view of this corrector button 100.

Figure 3:
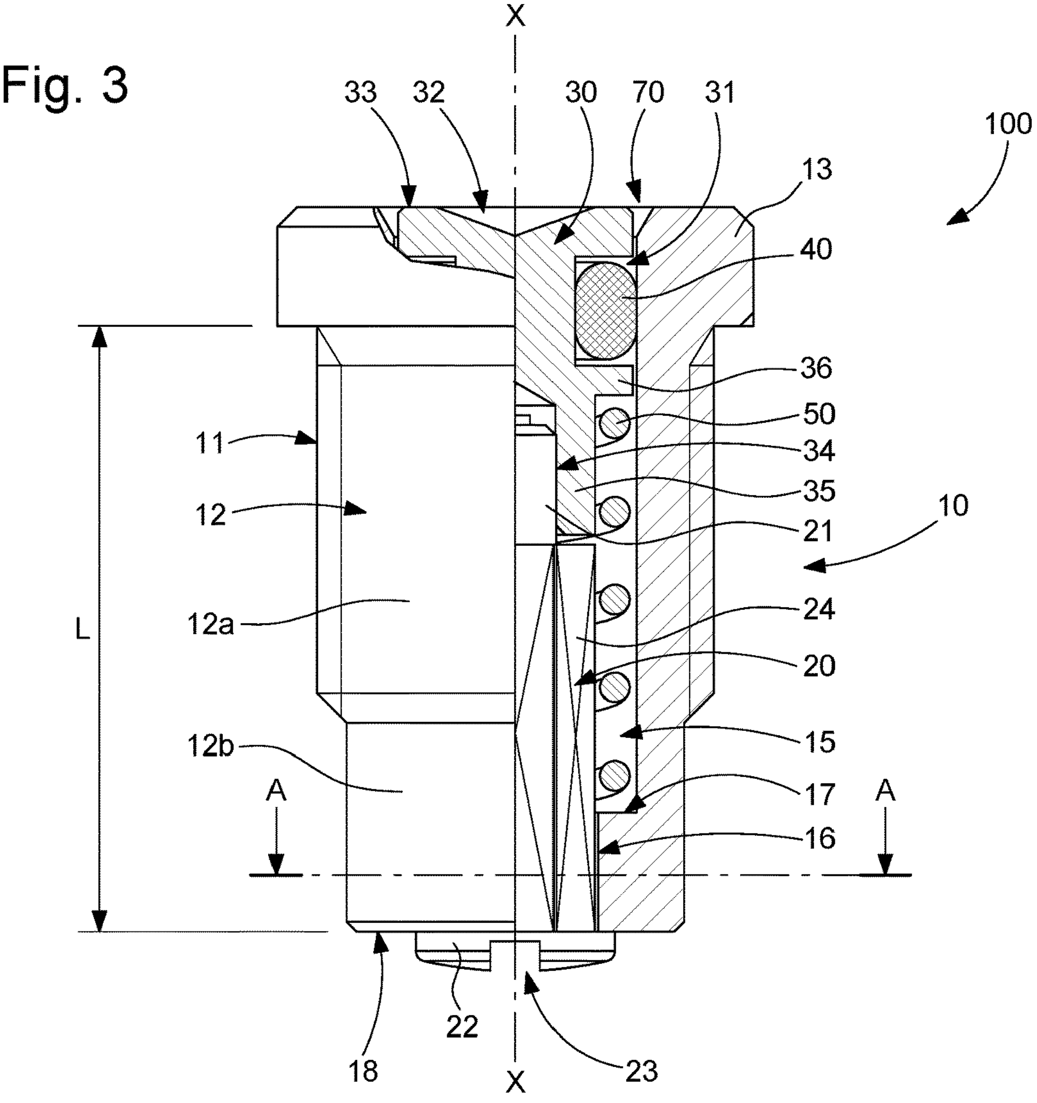
FIG. 3 represents a partial sagittal sectional view of the embodiment example illustrated in FIG. 1, in a rest position.

FIG. 3 represents a partial sagittal sectional view of the embodiment example illustrated in FIG. 1, in a rest position.

With reference to FIGS. 1 to 3, the corrector button 100 comprises a socket 110 comprising a tubular part 12 and a head 13, the head 13 forming a first end of the socket 110.

Figure 6:
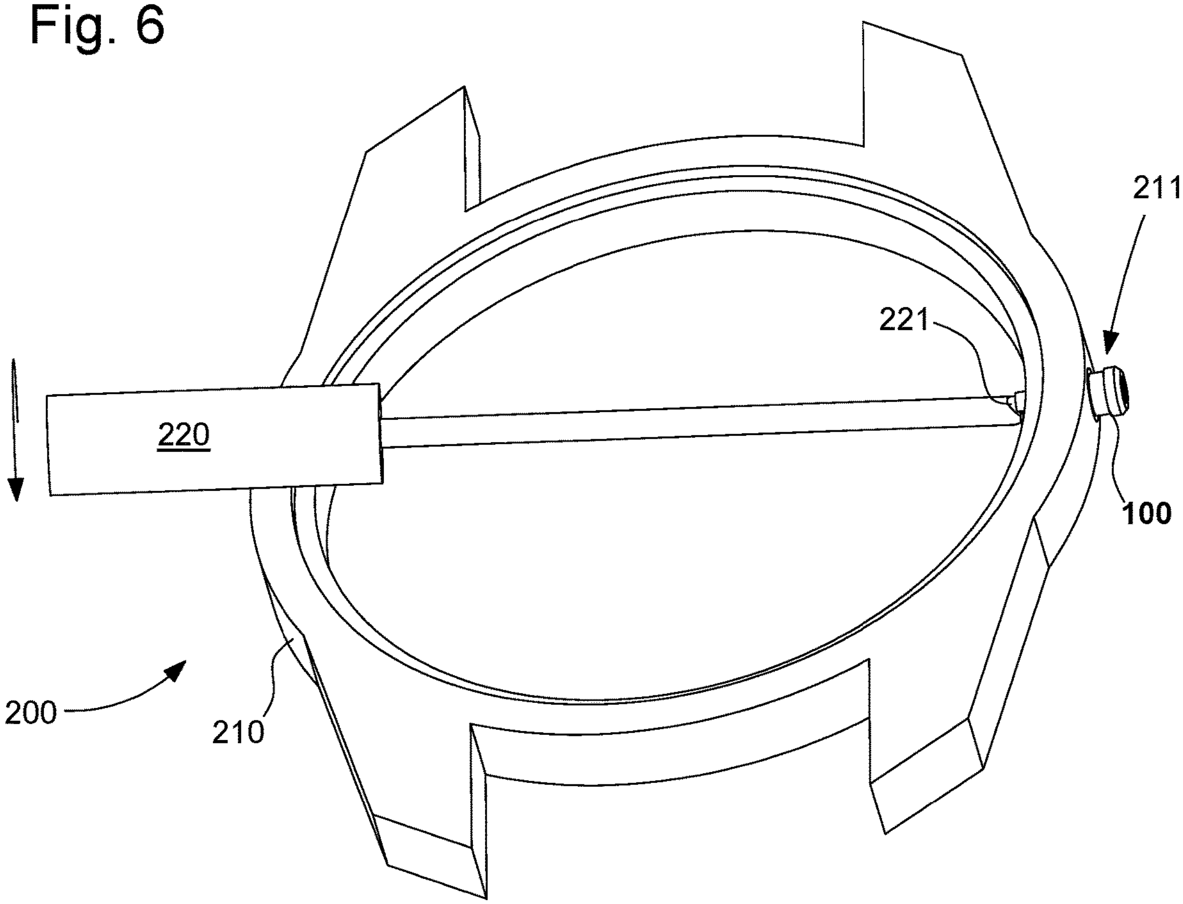
FIG. 6 illustrates the fitting of the embodiment example of the corrector button illustrated in FIG. 1 to a watch case.

The tubular part 12 has a threaded portion having a threading 11 with a view to the assembly thereof of a watch case 200 (represented in FIG. 6), for example at a middle 210 of the watch case 200.

To this end, the watch case 200 comprises assembly means configured to receive the socket 110 of the corrector button 100, and more specifically the threaded portion of the socket 110. The means for assembling the watch case are in the form of a tapped hole.

The threading 11 is arranged on a median portion **12*a* of the tubular part 12 of the socket 110, such that the thread 11 is not produced along the entire length L of the tubular part 12 of the socket 110. Thus, the distal portion 12*b* of the tubular part 12 opposite the head 13 has no threading. This distal portion 12*b* forms the second end of the socket 110**.

The head 13 has a diameter greater than the diameter of the tubular part 12, such that a shoulder 14 separates the head 13 from the tubular part 12. The shoulder 14 thus forms a support surface intended to come into contact with a relief of a bed 211 for fitting the middle 210 of a watch case 200 when fitting the corrector button 100.

The tubular-shaped socket 110 comprises a cavity 70 extending between the first end of the socket 110 and the second end of the socket 110, in other words between the head 13 and the distal portion **12*b* of the tubular part 12**.

The cavity 70 comprises:

- a first portion 15, arranged in the top part of the socket 110, opening at the first end of the socket 110, i.e. at the head, and
- a second portion 16, arranged in the bottom part of the socket 110, opening at the second end of the socket 110, and particularly at a bottom surface 18 of the socket 110.

The two portions 15 and 16 of the cavity 70 communicate with one another inside the socket 110, and have a different cross-section such that the first portion 15 of the cavity 70 has a bottom 17.

The first portion 15 of the cavity 70 has a circular cross-section and resembles a blind hole opening at the head 13 of the socket 110.

The first portion 15 extends essentially at the head 13 of the socket 110 and the median portion **12*a* comprising the thread 11 of the tubular part 12**.

The second portion 16 of the cavity 70, smaller in size than the first portion 15 has a non-circular cross-section.

The second portion 16 of the cavity 70 extends essentially at the distal portion **12*b* of the tubular part 12, and more specifically between the bottom 17 and the bottom surface 18 of the socket 110**.

The corrector button 100 further comprises a movable control rod 120, sliding in the socket 110, i.e. movable in translation inside the socket 110, along an axis X-X corresponding to the axis of revolution of the socket 110. The movable control rod 120 comprises a push-button 30 and a push-rod 20, rigidly connected to said push-button 30.

The push-rod 20 is for example driven onto the push-button 30.

The push-button 30 comprises an impression 32 arranged at the top face 33 of the push-button 30, the top face 33 being the face that can be seen by the user when the corrector button 100 is fitted onto the watch case 200. The impression 32 has a shape adapted to receive and promote the holding in position of a tool for operating the corrector button 100.

For example, the impression 32 is of conical shape so as to enable a centring of the pointed tool and prevent any slippage of the tool when applying a force on the push-button 30.

The push-button 30 comprises an annular groove 31 arranged on the rim of the push-button 30. The annular groove 31 forms a bed for receiving a sealing organ 40, for example an O-ring type seal. The sealing organ 40 ensures the sealing between the push-button 30 and inside the socket 110.

The push-button 30 is intended to move longitudinally in the first portion 15 of circular cross-section of the cavity 70, under a user's action.

The push-rod 20 is intended to actuate a control fitted inside the watch case 200 when the user presses in the movable control rod 120.

The push-rod 20 comprises a push-rod body 24 and a push-rod head 22 capable of actuating a control, a lever or other of a horological mechanism.

The push-rod head 22 also comprises an organ for rotating the push-rod 20 but also the corrector button 100 as a whole. The push-rod head 22 has an equivalent shape to a shape of a screw head, such that the push-rod head 22 is slightly wider than the push-rod body 24 and than the second portion 16 of the cavity 70 of the socket 110.

The push-rod head 22 comprises an impression 23, forming the organ for rotating the push-rod 20, wherein the male end 221 of a tool 220 can be inserted to rotate the push-rod 20. Advantageously, the impression 23 is an impression corresponding to a common widely commercially available tool, that any horologist, repairer, DIY enthusiast may have. For example, the impression 23 is a slot adapted to receive a flat tip of a flat screwdriver. However, the impression 23 could also be a cross-shaped or six-ray star-shaped impression.

A return organ 50, for example a return spring, is housed inside the socket 110 of the corrector button 100, and more specifically at the first portion 16, of circular cross-section, of the cavity 70 of the socket 110.

The return organ 50 is positioned around the movable control rod 120, more specifically around the push-rod body 24 and the bottom portion 35 of the push-button 30.

The return organ 50 tends to extend between a first fixed banking formed by the bottom 17 of the first portion 15 of the cavity 70 of the socket 110 and a second movable banking formed by a collar 36 of the push-button 30.

In the embodiment example, the collar 36 is advantageously formed by the bottom portion of the annular groove 31 receiving the sealing organ 40.

FIG. 3 represents the rest position of the corrector button 100 wherein the return organ 50 is not compressed and the push-rod head 22 is returned to bear on the bottom surface 18 of the socket 110 by the return organ 50.

Figure 4:
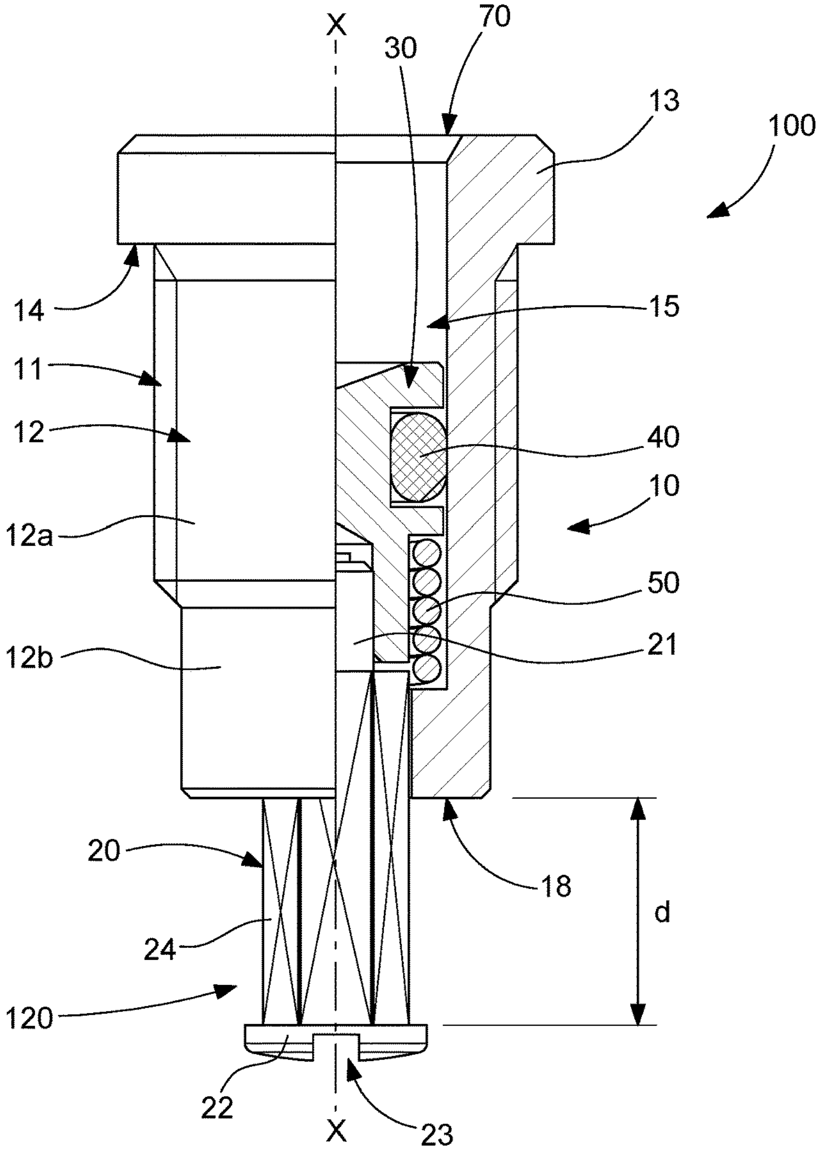
FIG. 4 represents a partial sagittal sectional view of the embodiment example illustrated in FIG. 1, in an activated position.

FIG. 4 represents the activated position of the corrector button 100 wherein the return spring 50 is compressed between the bottom 17 arranged at the cavity 70 of the socket 110 and the collar 36 of the push button 30. In this configuration, the push-rod 20 protrudes from the socket 110, the distance between the push-rod head 22 and the bottom surface 18 of the socket 110 representing the travel d of the corrector button 100.

Figure 5:
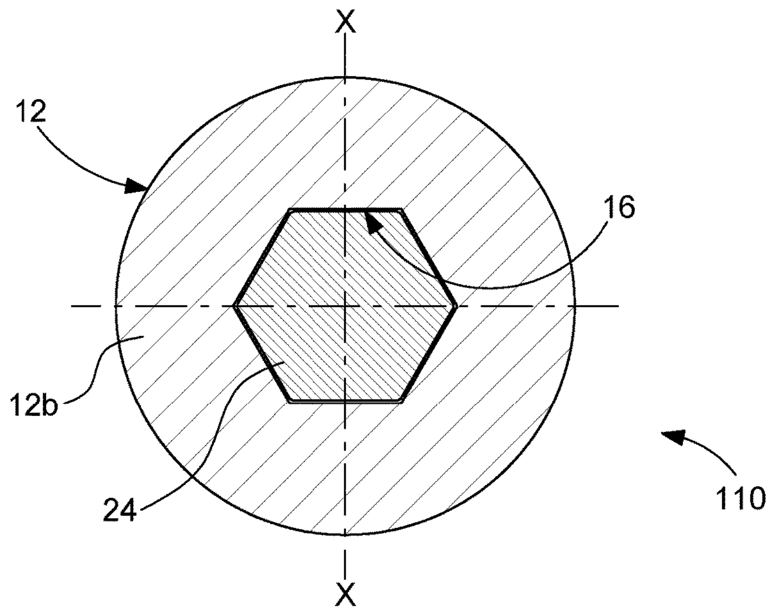
FIG. 5 represents a transverse cross-section along the axis A-A illustrated in FIG. 3, of the embodiment example of the corrector button illustrated in FIG. 1.

As represented by FIG. 5, illustrating a section view along the axis A-A, the push-rod body 24 has at least one portion of polygonal cross-section, for example of square or hexagonal shape as represented in FIG. 5. Advantageously, the entire push-rod body 24 is of polygonal shape.

To this end, the second portion 16 of the cavity 70 of the socket 110 has a cross-section of complementary cross-section. The dimensions of the second portion 16 of the cavity 70 are determined so as to allow an axial movement of the push-rod 20 along the axis X-X, i.e. a minimum operating play is produced.

The portion of polygonal cross-section of the push-rod body 24 thus makes it possible to rotate the socket 110 when rotating the push-rod head 22 by means of a conventional tool.

The corrector button 100 according to the invention, as detailed above, thus makes it possible to simplify and facility the screw-fitting of the complete corrector button 100 at a middle 210 of a watch case 200.

The fitting of the corrector button 100 is performed as follows: the socket 110 of the corrector button 100 is positioned at a bed 211 having a tapped portion of a watch case 200 via the outside of the middle 210. The corrector button 100 is screwed to the middle 210 by means of the thread 11 arranged on the threaded median portion 12*a* of the tubular portion 12 of the socket 110. The screwing of the corrector button 100 is performed via the inside of the watch case 200 by means of a convention tool 220, for example a flat screwdriver. For this, the male end 221 of the tool 220 is engaged at the female impression 23 of the push-rod head 22, here for example a slot, then the tool is turned in a first direction of rotation enabling the engagement of the thread 11 in the bed 211 having a tapped portion 211 of the middle 210. Due to the polygonal shape of the push-rod body 24 and of the second portion 16 of the cavity 70 of the socket 110, the rotation applied on the push-rod head 22 rotates the socket 110 thus enabling the fitting thereof by screwing and the gripping thereof on the middle 210 of a watch case 200.

Advantageously, the bed 211 has a complementary shape to the corrector button 100. More specifically, the bed 211 has a tapped portion for screwing the socket 110, and more specifically the tubular part 12 of the socket 110 and a countersink to receive the head 13 of the socket 110. The bottom of the countersink forms a shoulder forming a positioning banking for facilitating the correct positioning of the corrector button 100 in the middle 210 and ensuring the desired gripping.

In a specific embodiment of the invention, the thread of the threading 11 of the socket 110 can be chosen to be right-handed so that the direction of rotation of the tool 220 is the conventional screwing direction, i.e. in the clockwise direction, when screwing the corrector button 100. However, a left-hand thread is also envisaged.

The invention claimed is:

1. A corrector button for a watch case comprising:
- a socket having an axis of revolution and having a threading arranged on the outer rim of a portion intended to be fitted by screwing onto a watch case, and having a cavity extending between a first end of the socket and a second end of the socket;
- a movable control rod engaged in the cavity of the socket, said movable control rod comprising a push-rod, having a rotation organ, and a push-button rigidly connected to said push-rod, each of the push-rod and push-button are configured to move in translation along said axis of revolution; and
- a return organ for repositioning said movable control rod into a rest position,
- wherein said cavity has a portion of polygonal cross-section,
- wherein said push-rod of said movable control rod comprises a portion having a complementary polygonal cross-section in respect of said portion of polygonal cross-section of said cavity, such that the rotation of the push-rod via the rotation organ drives the rotation of said socket,
- wherein the push-button comprises an annular groove on an outer edge surface of the push-button, the annular groove being configured to receive a sealing organ,
- wherein the portion of the socket having the threading arranged on the outer rim is a median portion positioned between said first end of the socket and said second end of the socket, and
- wherein the return organ is positioned in a radial direction from the median portion of the socket having the threading.

2. The corrector button for a watch case according to claim 1, wherein the push-rod comprises a push-rod head forming a first end of said push-rod, said push-rod head comprising an impression forming said rotation organ of said push-rod.

3. The corrector button for a watch case according to claim 2, wherein said impression is a slot capable of cooperating with a male part of a drive tool.

4. The corrector button for a watch case according to claim 1, wherein said push-rod is driven with said push-rod.

5. The corrector button for a watch case according to claim 1, wherein the sealing organ ensures sealing between said push-button and said socket.

6. The corrector button for a watch case according to claim 1, wherein the push-button comprises, at the top surface thereof, an impression configured to promote the positioning of one end of a tool.

7. The corrector button for a watch case according to claim 6, wherein said impression of said push-button is of conical shape.

8. The corrector button for a watch case according to claim 1, wherein said return organ is disposed between a first fixed banking and a second movable banking arranged at said push-button.

9. The corrector button for a watch case according to claim 8, wherein said fixed banking is formed by a bottom arranged at said cavity of the socket.

10. The corrector button for a watch case according to claim 1, wherein said threading arranged on the outer rim of the portion of the socket has a right-hand thread.

11. A watch case comprising a middle having a bed, having a tapped portion, and a corrector button comprising:

a socket having an axis of revolution and having a threading arranged on the outer rim of a portion intended to be fitted by screwing onto a watch case, and having a cavity extending between a first end of the socket and a second end of the socket;

a movable control rod engaged in the cavity of the socket, said movable control rod comprising a push-rod, having a rotation organ, and a push-button rigidly connected to said push-rod, each of the push-rod and push-button are configured to move in translation along said axis of revolution; and a return organ for repositioning said movable control rod into a rest position, wherein said cavity has a portion of polygonal cross-section, wherein said push-rod of said movable control rod comprises a portion having a complementary polygonal cross-section in respect of said portion of polygonal cross-section of said cavity, such that the rotation of the push-rod via the rotation organ drives the rotation of said socket, wherein said corrector button being screwed into said bed of said middle, wherein the push-button comprises an annular groove on an outer edge surface of the push-button, the annular groove being configured to receive a sealing organ, wherein the portion of the socket having the threading arranged on the outer rim is a median portion positioned between said first end of the socket and said second end of the socket, and wherein the return organ is positioned in a radial direction from the median portion of the socket having the threading.

12. A watch case according to claim 11, wherein said corrector button is embedded in said middle.

13. A method for assembling a corrector button with a watch case, said corrector button comprising:

a socket having an axis of revolution and having a threading arranged on the outer rim of a portion intended to be fitted by screwing onto a watch case, and having a cavity extending between a first end of the socket and a second end of the socket;

a movable control rod engaged in the cavity of the socket, said movable control rod comprising a push-rod, having a rotation organ, and a push-button rigidly connected to said push-rod, each of the push-rod and push-button are configured to move in translation along said axis of revolution; and a return organ for repositioning said movable control rod into a rest position, wherein said cavity has a portion of polygonal cross-section, and wherein said push-rod of said movable control rod comprises a portion having a complementary polygonal cross-section in respect of said portion of polygonal cross-section of said cavity, such that the rotation of the push-rod via the rotation organ drives the rotation of said socket, wherein the push-button comprises an annular groove on an outer edge surface of the push-button, the annular groove being configured to receive a sealing organ, wherein the portion of the socket having the threading arranged on the outer rim is a median portion positioned between said first end of the socket and said second end of the socket, and wherein the return organ is positioned in a radial direction from the median portion of the socket having the threading, the method comprising a step of screwing said corrector button into a bed having a tapped portion and arranged at the middle of said watch case, the screwing step being performed by inserting a rotation tool inside the watch case, said rotation tool acting upon said push-rod by engaging said rotation tool into the rotation organ, the rotation of said push-rod driving the rotation of said socket and the screwing of said corrector button.

* * * * *